Jan. 14, 1936.   T. B. TYLER   2,028,028
CLUTCH MECHANISM FOR TRANSMISSIONS
Filed May 19, 1932   2 Sheets-Sheet 1
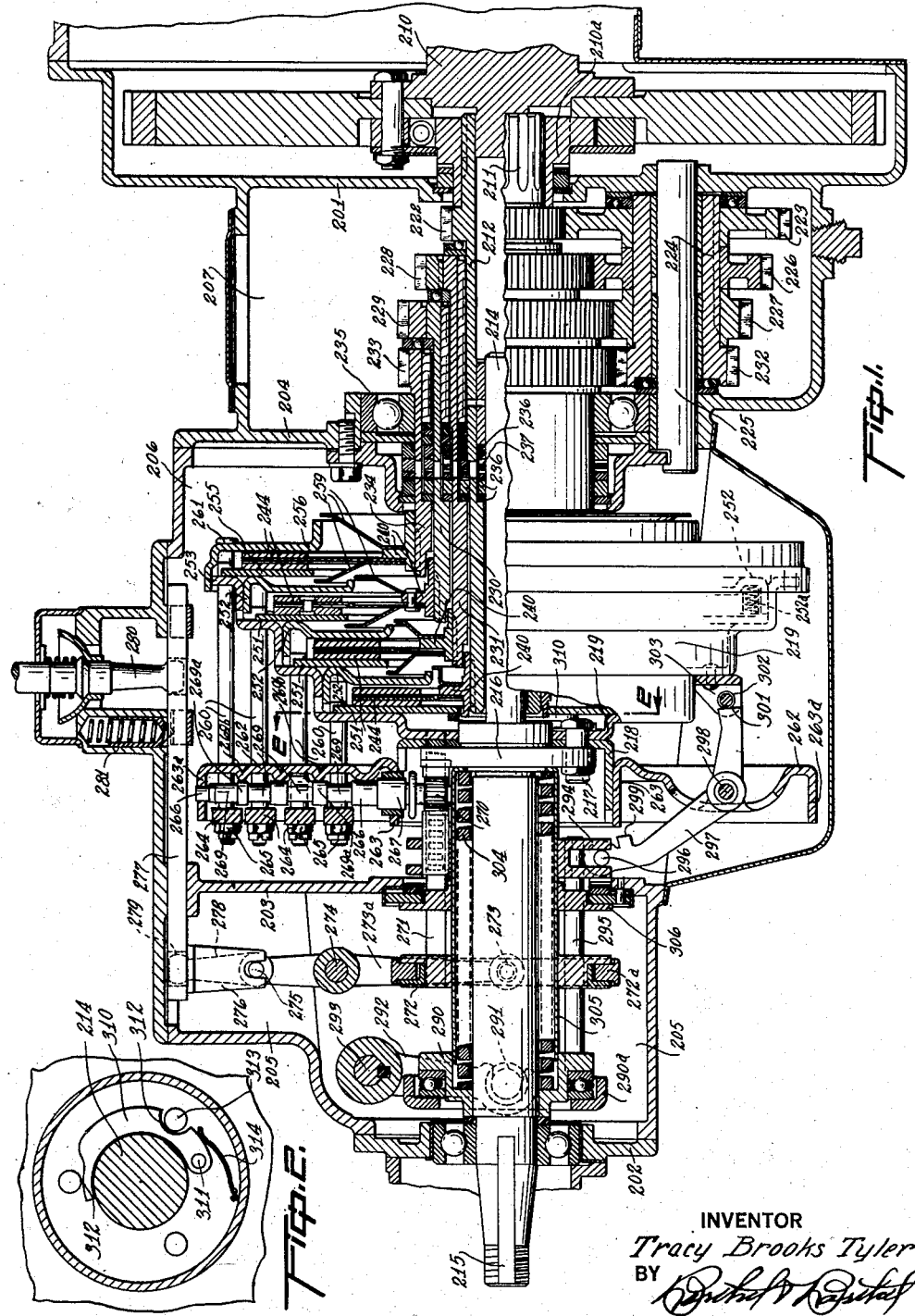
INVENTOR
Tracy Brooks Tyler
BY 
ATTORNEYS Jan. 14, 1936.  T. B. TYLER  2,028,028
CLUTCH MECHANISM FOR TRANSMISSIONS
Filed May 19, 1932  2 Sheets-Sheet 2
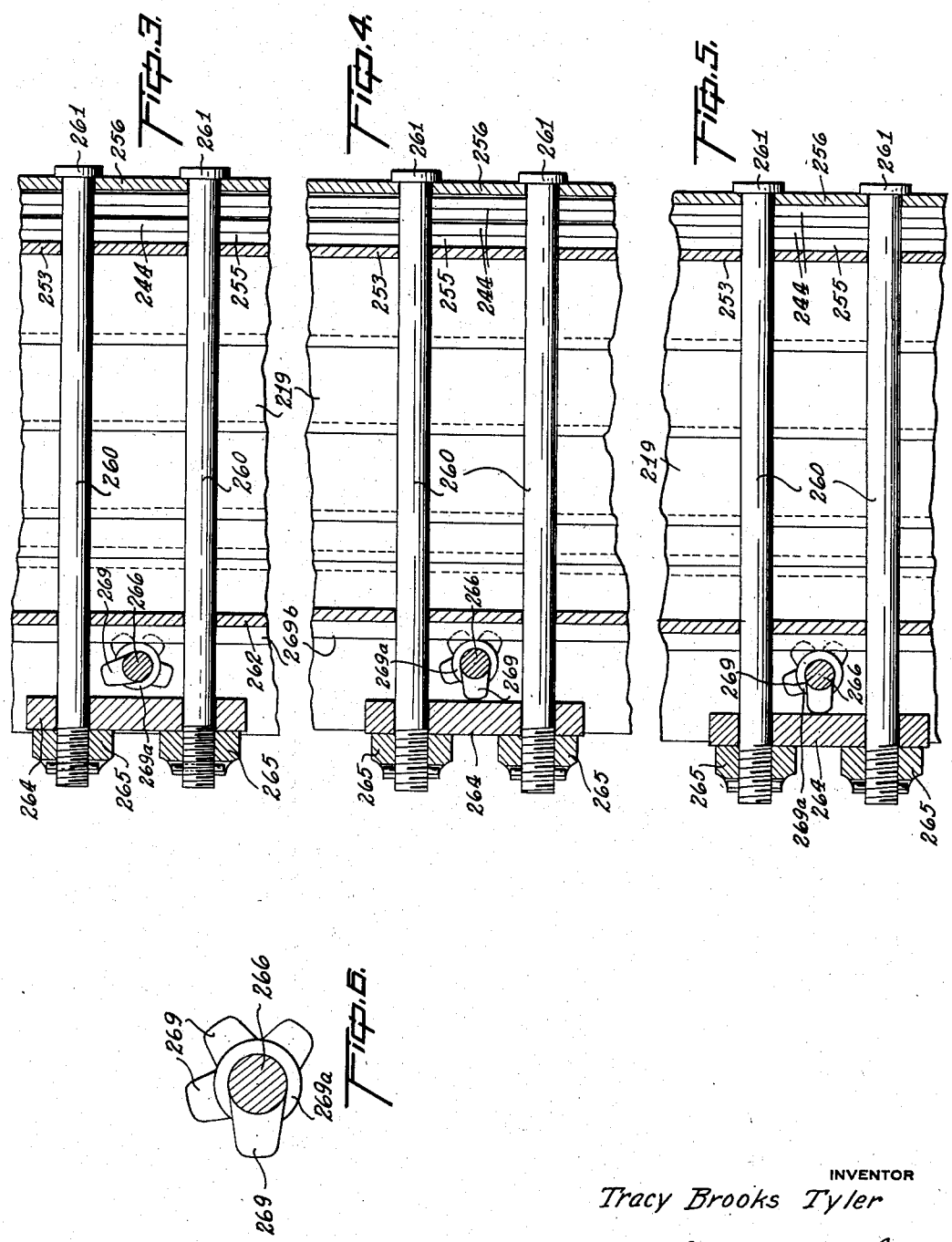
INVENTOR
Tracy Brooks Tyler
BY
ATTORNEYS Patented Jan. 14, 1936

2,028,028

UNITED STATES PATENT OFFICE 2,028,028

CLUTCH MECHANISM FOR TRANSMISSIONS

Tracy Brooks Tyler, Detroit, Mich., assignor to The Monopower Corporation, Detroit, Mich., a corporation of Michigan Application May 19, 1932, Serial No. 612,194

10 Claims. (Cl. 192—48)

This invention relates to clutches for use in transmissions, such as are used on motor vehicles, industrial machinery, etc.

Objects of the invention are to improve transmissions of the type disclosed in my copending application Serial No. 611,384, filed May 14, 1932, specifically as follows:

(1) To provide a group of friction clutches for superseding the positive tooth clutches of the prior transmissions;

(2) To provide novel clutch selector and actuating means, etc., (3) To eliminate the necessity of providing a master clutch for the vehicle etc., (4) To prevent a reverse drive being set up under inappropriate conditions, etc., (5) To provide other novel details of construction, hereinafter mentioned.

The principal object of this invention, as contradistinguished from other objects, is to provide for the construction of a transmission which does not have positive tooth clutches to be meshed for torque selection and change. In the herein described embodiment of the invention, the parts which are to be selected and moved for drive connection, comprise friction clutches, one of which may be selectively engaged to create drive connections, the clutch engagement being manually controllable by means, such as are generally provided.

A further object of the invention is to provide friction clutches for a transmission so that the selectable torque transferring elements therein may be engaged, at any speed of the vehicle, and perfectly silently.

A still further object is to provide friction clutches for a transmission so that engagement of the higher torque or lower speed elements may be effected silently and without difficulty even when the vehicle is moving at a high rate of speed, this feature permitting the operator to use the engine as a brake for the vehicle with much more freedom and peace of mind than is possible with conventional transmissions.

A still further object is to provide friction clutches for a transmission of the character described wherein the means for selection and operation of the clutches has a very slight action. Accordingly, even when the operator-controlled, selector manipulator has a great leverage ratio over the element-moving means, nevertheless the range of movement of the manipulator is very slight. Accordingly the manipulator may be in the form of a short handle, as contrasted with the long levers now used.

A still further object is a friction surface clutch having a pressure plate for causing the surfaces to engage and disengage, and a means having two ratios of movement with respect to the pressure plate, to take up extraordinary clearance between the surfaces relative to one another, without too great a movement of the means.

Still further objects are to provide for the construction of a transmission having selectable and engageable "dry" clutches therein.

Figure 1 shows an embodiment of the invention in longitudinal vertical section;

Fig. 2 is a transverse section, as if on line 2—2 of Fig. 1;

Fig. 3 is a fragmentary plan view illustrating the selecting and engaging elements in the neutral position;

Fig. 4 is a view similar to Fig. 3 illustrating one of the selecting members in a selecting position and the engaging members in neutral;

Fig. 5 is a view illustrating the selecting members in the selecting position and the engaging members engaged, and Fig. 6 is a detail of the selecting cams.

Referring to these figures it will be seen that the transmission includes a casing having end walls 201 and 202 and transverse partitions 203, 204, defining compartments 205, 206 and 207 respectively, these compartments being sealed from one another by means to be described. The outer compartments 205 and 207, containing meshed driven and driving parts, respectively, are partially filled with lubricating fluid whereas the inner one 206 containing dry plate friction clutches, contains no lubricating or other fluid.

The driving means includes an engine shaft 210, outside the wall 201, and provided with a flanged collar 210a having internal splines cooperating with external splines 211 on a hollow sleeve 212 projecting through the wall 201. The sleeve 212 journals the end of a driven shaft 214 which extends from within the compartment 207 through walls 204, 203, and 202, respectively, that is through compartments 206 and 205, respectively, and which terminates in a free end 215 to which may be connected the vehicle propeller shaft. That portion of the driven shaft 214 within compartment 206 is provided with an enlargement or flange 216 to which, by means of peripherally spaced bolts 217 are secured in back to back relation, a pair of dished drums 218 and 219, these having their planar walls against the flange 216. The annular flange of drum 218 projects towards the left, and the annular flange of drum 219, which is stepped as indicated to provide portions of various diameters, projects towards the right.

Formed integral with the driving sleeve 212 is a gear 222 in constant mesh with a gear 223 keyed to and mounted on a hollow sleeve 224, the latter being journalled on a stationary countershaft 225 supported in transverse walls 201 and 204 of the transmission casing. Also keyed to the hollow sleeve 224 are gears 226 and 227 which are in constant mesh with gears 228 and 229 secured to nested sleeves 230 and 231 journalled on rollers surrounding the driving sleeve 212 and the right hand end of driven shaft 214. The sleeve 224 is further formed with a gear 232 which, through an idler gear, not shown, is meshed with a gear 233 formed integral with a sleeve 234 passing through and journalled in the transverse wall 204 of the casing, and nesting sleeves 230 and 231.

A bearing 235 on wall 204 journals the nested sleeves 234, 231, 230, and 212, as indicated.

The construction thus far described is disclosed in my prior application, Serial No. 611,384, above mentioned.

Suitable means for forming a seal in the aperture of the transverse wall 204 through which pass the various sleeves are provided, and such means may include a series of ring washers, 236, maintained in sealing relation by annular crimped springs 237, these seals serving to prevent lubricant within the compartment 207 from passing through and into the dry compartment 206.

The sleeves are so dimensioned that an inner one projects beyond the next adjacent one, to provide exposed portions, externally splined, as indicated, to cooperate with the internal splines, of collars 240 inclusive, to which clutch plates 244 are riveted or otherwise secured. These clutch plates are of varying dimensions as shown, each lying within a step of the stepped drum 219 and each having a diameter corresponding to that of the stepped portion within which it is disposed. Further to each clutch plate on opposite sides are riveted friction faces, not referenced, to form clutch discs. In the stepped portions of the drum 219 are annular backing plates 251 and annular dished pressure plates 252, these enclosing the clutch discs within each step of the drum, and receiving between them springs 252a. Further, to the right of the annular flange 253 which forms the edge of the drum and enclosing the clutch plate 244, are a backing plate 255 and a pressure plate 256, dished as shown to form an end enclosure for the largest clutch disc. The various clutch discs further are provided with sheet metal annular baffle plates 259 which prevent any lubricant that might have escaped into compartment 206 from reaching the friction faces of the clutch discs.

The parts described above constitute means for effecting driving relations between the drive shaft 210 and the driven shaft 214, the drive, in any instance, going to the constantly rotating clutch plates and then to the drum, through engagement between any backing plate and pressure plate selected. Since the various clutch plates 244 rotate at different speeds due to the drive gearing in compartment 207, selection of the driving relation between shafts 210 and 214 is accomplished by selection of one of the four sets of engaging elements as shown, these elements comprising on the one hand the four clutch plates with their backing and pressure plates and on the other, the drum 219. Means for selecting the set of engaging elements to be engaged are provided and will be described below.

Forming a constellation about the axes of shafts 210, 214 are pull rods 260. In the embodiment shown, there will be four groups of rods, each group containing three sets, each set containing a pair, thus making twenty-four pull rods in all. The four groups are spaced at different radial distances from the axis, and are of different lengths. The three sets of each group are equally spaced about the axis of the shafts, and the pairs of each group are closely spaced, all the rods of a group being of the same length.

The rods terminate in heads 261 engaging and behind the pressure plates and pass through apertures in a slidably mounted pressure drum 262, the latter having an inner annular flange 263 journalling and supporting it upon the annular flange of drum 218 fixed to shaft 214. The pressure drum further has an outer annular flange 263a. The left hand ends of the rods of each pair are passed through the apertures in the pressure drum 262 and are connected by links 264, and are provided with nuts 265, as shown. There will be twelve of the links 264 arranged in four groups of three links each. Radially disposed in and equally spaced about the pressure drum 262 are three cam shafts 266, each of these having an inner portion 267 journalled in the inner flange 263 of the same. Each cam shaft is provided with a plurality of cams 269 in alignment with and adapted to select links 264 on the ends of rods 260. The cam shafts further have portions 269a of circular cross section bearing against annular ribs 269b of the drum 262. Each cam shaft has an end 270 projecting through the flange 263 of the pressure drum and the slotted flange of drum 218, and formed as pinions meshed with rack teeth formed on selector rods 271 which are longitudinally disposed and peripherally spaced about the axes of the shafts 210, and 214, there being in this embodiment three such selector rods.

The selector rods are suitably supported in bushings etc., and have ends at times adapted to be projected through the planar plates of drums 218 and 219 and into the smallest step of the latter. The selector rods are secured at their other ends to a slidably mounted collar 272 having a second collar 272a thereon, the latter having radially projecting pins 273 in engagement with the yoked end of a selector fork 273a, the latter being pivoted on a cross shaft 274 as shown, and having an outwardly projecting pin 275 in engagement with the forked end of an arm 276 secured to a shifter rail 277 extending longitudinally of the casing under the cover thereof. The fork 273a has in addition a portion 278 projecting upwardly beyond the pin 275 and terminating in a round tongue-like end 279 disposed within a slot formed in the end of a second shifter rail, not shown. Means to select and reciprocate one or the other of the shifter rails are provided and the same may include a shifter lever 280, such as is well known in the art. Further, spring pressed detents indicated at 281 are provided for the shifter rails and serve to maintain positions thereof.

It will be seen that when a shifter rail is selected and reciprocated, selector rods 271 will be moved thereby through fork 273a, so that their rack teeth will rotate cam shafts 266 and will thus cause selected ones of their cams to align with a selected group of cross links 264.

The means for causing engagement of the clutches in the transmission further includes a collar 290 mounted to slide upon shaft 214 in compartment 205, and a second collar 290a thereon, the latter having outwardly projecting pins 291 whereby it may be reciprocated on shaft 214 by the forked end of a yoke 292 keyed to a cross shaft 293 rotatable by the operator, through a pedal, or through a power actuator, not here shown.

The collar 290 is connected to a grooved slidable collar 294 disposed in compartment 206 by connecting rods 295 which are peripherally spaced about the axis of the shaft. The grooved collar 294, by means of pins 296 on the ends of pressure fingers 297 pivoted at 298 to the pressure drum 262, is connected to these fingers, these further having lugs 299 adapted to engage the edge of the inner flange 263 of pressure drum 262. The fingers at their free ends are provided with cam surfaces 301 adapted to engage rollers 302 journaled in brackets 303 of the axially fixed drum 219. A heavy coiled spring 304 enclosed in a sleeve 305, surrounds shaft 214 and abuts flange 216 of the latter as well as collar 290, to urge movement of the latter to the left. A suitable sealing means 306 through which pass the push rods 295 and the sleeve 305, seals apertures in wall 203 and thus isolates compartment 205 from compartment 206.

It will be seen that movement of collar 290 to the right against the spring 304 causes pressure fingers 297 to pivots and moves the cam ends 301 out of engagement with the rollers 302, at which time the lugs 299 engage the annular flange 263 to move the pressure drum 262 to the right and thus to free cam shafts 266 of cross links 264. Movement of collar 290 to the left, caused by spring 304, causes pressure drum 262 to be moved to the left by the engagement of cam ends 301 of these fingers with rollers 302, such movement of the pressure drum serving to cause previously selected cams 269 on cam shafts 266 to engage certain of the cross links 264 to pull the corresponding pull rods 260 to the left and to cause engagement of the thus selected one of the sets of clutches in the transmission.

The operation of the transmission will now be described. When the clutch collar 290 is moved to the right through rotation of cross shaft 293, cam shafts 266, together with pressure drum 262, are also moved to the right, away from the cross links 264 of the pull rods 260, thus freeing the latter. The operator may then move lever 280 crosswise to select one or the other of the shifter rails and then longitudinally to reciprocate the selected rail and to move selector rods 271 to the right or to the left, as the case may be, a thus selected distance, thus causing selected rotation of the cam shafts 266 and alignment of thus selected cams 269 with pull rod cross links 264. When the operator frees clutch collar 290, it will be urged to the left by the spring 304, and the previously selected cams 269 of the cam shafts will then exert pressure against a thus selected set of links 264 and pull the rods 260 to the left, thus causing a thus selected set of clutch elements to be engaged for torque transmitting purposes.

The necessary movement of any cam to establish a selection is a minimum of three eighths of an inch, whereas the releasing and engaging movement of member 262 is a maximum of three thirty-seconds of an inch. Accordingly the cams are constructed to allow for three thirty-seconds of an inch displacement in either direction from the high point thereof without disturbing the effectiveness of the cam. Therefore the movement of member 262 to establish engagement or disengagement of any pressure plate does not rotate the cam shaft 269 sufficiently to destroy a selective setting of any cam thereon.

In order to provide a neutral position in the transmission, the shifter rails are provided with neutral positions which when translated through the selector parts so position the cam shafts 266 that no cams thereon are operatively adjacent a cross link set. In this position, therefore, movement of the cam shafts with the pressure drum, will not cause any of the clutches to become engaged, due to the free movement in the spaces otherwise occupied by the high points of the cams.

In order to prevent the reverse drive or right hand clutch elements from becoming engaged when the speed of the driven shaft is above a critical speed, a centrifugal governor device, shown to small scale in Fig. 2 and referenced 310 is provided. The governor device is in the form of an arcuate plate and is pivoted to the drum 219 in the smallest step thereof, at 311. It has notches 312 in peripheral alignment with the apertures 313 of the planar portion of drums 219 and 218 through which apertures the selector rods 271 must pass when these rods are moved to their extreme right or reverse position. The governor 310 is normally urged inwardly towards the shaft 214 by a spring 314 to such a position that its notches are clear of the apertures 313, thus permitting the selector rods to be moved to reverse position. However, when the speed of the shaft 214 and drum 219 secured thereto, passes a critical speed, the governor arm 310, due to centrifugal action, moves outwardly and partially covers the apertures 313, thus preventing movement of selector rods 271 to the extreme right or reverse position.

It will be observed that the transmission of Figs. 1 and 2 possesses many, though perhaps not all of the advantageous characteristics inherent to the transmission of application Serial No. 611,384, and possesses certain characteristics not inherent to that transmission. For example, the transmission of Figs. 1 and 2 when used on an automotive vehicle eliminates the necessity of providing a master clutch on a vehicle, since the dry type friction clutches permit sufficiently smooth engaging action to start the vehicle properly and disengagement of the selective engaging parts is and must be accomplished within the transmission before selection of these parts can be effected.

Still further it will be observed that the transmission is so constructed that those parts which should be lubricated, namely, the meshing gears, pinions, sleeves etc., the throw-out parts near collar 290 etc., and the various journals for the rotating parts are disposed in compartments which may be partially or wholly filled with lubricant, and that effective seals are provided to prevent the lubricant from these compartments from entering the compartment within which the dry clutches are disposed and from reaching the clutch plates.

It will further be observed that the parts of the engaging mechanism that are moved against the influences of the heavy spring 304 need be moved only a slight distance, just great enough to free cam shafts 266 of cross links 264 after which the pressure drum 262 moves directly with collar 294 through contact of the lugs 299 with flange 263. Accordingly, the clutches may be designed to have a great clearance and freedom between the engaging plates, without increasing the distances of movement of the spring opposed parts.

For example, assume that in order to provide adequate clearance between the friction surfaces of the clutches, it is necessary to permit the pressure plates 252—256 to move "X" distance; and also assume that it is necessary to provide the operator with a 10:1 mechanical advantage over the means for opposing clutch disengagement.

Now in order to get X movement of plates 252—256 it would be necessary to compress spring 304, 10 X, were no direct ratio movement means provided. But by providing such means, namely, lug 299 and its associated parts, I can provide two ratios of movement between collar 294 and plates 252—256. Until lug 299 engages flange 263 of drum 262, movement of collar 294, due to the 10:1 ratio effective through cams 301, causes $\tfrac{1}{10}$ as much movement of plates 252—256. When lug 299 engages flange 263, cams 301 are clear of rollers 302 and further movement of collar 294 then causes $\tfrac{10}{10}$ as much movement of plate 252. Accordingly the total movement of collar 294, or the total compression of spring 304, is not equal to 10 X, but is less than 10 X by so much of the movement that takes place while lug 299 is in contact with flange 263, that is after cam 301 leaves roller 302.

It will also be observed that there has been provided a transmission wherein a reverse drive cannot be set up unless the vehicle speed, or more accurately, the driven shaft speed, is below a predetermined mark.

It will also be observed that the transmission disclosed possesses certain other desirable characteristics, whose provision forms part of the objects of the invention. For example, as in Fig. 1, the highest torque clutch is connected to the largest one of the driving sleeves, the intermediate torque clutch is connected to a smaller sleeve, and the lowest torque clutch is connected to the smallest sleeve.

Further, since the driving sleeves, to which the clutches are fixed at one end and to which the gears are fixed at the other, are so arranged that the higher torque sleeves are comparatively short as contrasted with the lower torque sleeves, the task of preventing the arising of unsafe twisting stresses in the sleeves, is rendered much easier than would be the case were the design otherwise.

Further, it will be seen that the clutches are so arranged that the clutches which are designed to receive greater loads have greater leverage arms, measured from the axis of shaft 214, than those which receive smaller loads. This is obviously a desirable feature.

It will also be observed that the clutches, both individually, and as a group, are between the driving parts, individually and as a group, and the driven parts individually and as a group. Accordingly, when the vehicle is in "high", that is with the driven shaft directly connected to the driving or engine shaft, the speed of the non-driving clutches and gears, that is to say, the clutches and gears that are not then selected for driving, is less than the speed of the driving shaft. This is in beneficial contrast to clutch type transmissions wherein selective friction or pressure clutches are disposed between the engine and the torque changing elements, and wherein the unselected driving parts rotate at speeds much greater than that of the driven parts, when direct or high speed (low torque) drive is selected.

Further, since there are no gears or positive tooth clutches to be meshed when a change in the forward driving relation of said engine to propeller shaft is desired, but instead friction clutch plates are to be engaged, such change or shift can be made silently at any speed of the vehicle or engine. This is of particular advantage when a change from "high" to "second", at high speed is desired, such change being well nigh impossible, and if possible, very noisy, in conventional transmissions.

What I claim is:

1. In a transmission, a plurality of clutches, engaging means in each clutch, pressure means, rods separately connected to different engaging means in different clutches and slidably associated with said pressure means, cams rotatably mounted on said pressure means and adapted to be rotated relative to said pressure means to engage said rods individually, and means for moving said pressure means to move said rods and actuate the engaging means with which the engaged rods are connected.

2. In a transmission, a plurality of clutches, engaging means in each clutch, pressure means, rods separately connected to different engaging means in different clutches and slidably associated with said pressure means, cams associated with said presure means and adapted to separately engage said rods, means for moving said pressure means to move said rods and actuate the engaging means with which the engaged rods are connected, and speed responsive means for preventing movement of the rods associated with a predetermined clutch.

3. In combination with a plurality of clutches, an engaging member in each clutch, means normally holding said engaging member disengaged, a pressure member, a set of rods connected with each engaging member, said rods being slidably received in said pressure member, movable means carried by said pressure member, means for moving said movable means relative to said pressure member for causing selective engagement with a set of said rods to hold the same against movement relative to said pressure member, said means being adapted to engage said rods selectively, and means for moving said pressure member to cause movement of an engaged set of rods therewith whereby the latter cause engagement of the clutch engaging member connected thereto.

4. In combination with a plurality of clutches, an engaging member in each clutch, means normally holding said engaging member disengaged, a pressure member, a set of rods connected with each engaging member, said rods being slidably received in said pressure member, movable means carried by said pressure member for engaging said rods to hold the same against movement relative to said pressure member, means for selectively moving said movable means relative to said pressure member for engaging said rods, said means being adapted to engage said rods selectively, and means for moving said pressure member to cause movement of an engaged set of rods therewith whereby the latter cause engagement of the clutch engaging member connected thereto.

5. In combination with a plurality of clutches, an engaging member in each clutch, means normally holding said engaging member disengaged, a pressure member, a set of rods connected to each engaging member, said rods being slidably received in said pressure member, cams rotatably mounted on said pressure member and adapted to engage said rods to prevent movement thereof relative to said pressure member, means for moving said cams relative to said pressure member to cause selective engagement thereof with different sets of rods, and means for moving said pressure member to cause movement of an engaged set of rods and engagement of the engaging member connected to said set of engaged rods.

6. In combination with a plurality of clutches, an engaging member in each clutch, means normally holding said engaging member disengaged, a pressure member, a set of rods connected to each engaging member, said rods being slidably received in said pressure member, cams rotatably mounted on said pressure member, means on said rods adapted to be engaged by said cams whereby the latter prevent movement of an engaged set of rods relative to said pressure member, means for setting said cams relative to said pressure member to cause selective engagement with said means on said rods, and means for moving said pressure member to move said rods and actuate said clutch engaging member.

7. In a clutch, a movable actuating member, a movable pressure member, rods connected to said actuating member and slidably received in said pressure member, disengageable means on said pressure member and movable relative thereto for engaging said rods to prevent movement thereof relative to said pressure member, and means operable remote from said pressure member for moving said pressure member to cause movement of said rods and said actuating member.

8. In a clutch, a movable actuating member, a movable pressure member, rods connected to said actuating member and slidably received in said pressure member, disengageable means on said pressure member and movable relative to said pressure member for engaging said rods to prevent movement thereof relative to said pressure member, manual means operable from a position remote from said pressure member for causing engagement or disengagement of said disengageable means with said rods, and means for moving said pressure member to cause movement of said rods and said actuating member.

9. In a clutch, a movable actuating member, a movable pressure member, rods connected to said actuating member and slidably received in said pressure member, manually operable means movably mounted on said pressure member for connecting said rods to said pressure member to move therewith, said manual means being operable from a position remote from said pressure member, and means for moving said pressure member to cause movement of said rods and said actuating member.

10. In a clutch, a movable actuating member, a movable pressure member, rods connected to said actuating member and slidably received in said pressure member, cams rotatably mounted in said pressure member, means for moving said cams into engagement with said rods, and means for moving said pressure member to move said cams and rods in a manner to actuate said actuating member.

TRACY BROOKS TYLER.